(12) United States Patent  (10) Patent No.: US 8,299,641 B2
Vyas et al.  (45) Date of Patent: Oct. 30, 2012

(54) MAGNETICALLY GEARED GENERATOR

(75) Inventors: Parag Vyas, Munich (DE);
Michal-Wolfgang Waszak, Nandlstadt (DE)

(73) Assignee: General Electric Company, Schenectady, NY (US)

( * ) Notice: Subject to any disclaimer, the term of this patent is extended or adjusted under 35 U.S.C. 154(b) by 533 days.

(21) Appl. No.: 12/543,683

(22) Filed: Aug. 19, 2009

(65) Prior Publication Data

US 2010/0052323 A1   Mar. 4, 2010

(30) Foreign Application Priority Data

Sep. 3, 2008   (EP) .................................... 08163611

(51) Int. Cl.
*F03D 9/00* (2006.01)
*H02P 9/04* (2006.01)
(52) U.S. Cl. ........................................... 290/44; 290/55
(58) Field of Classification Search .................. 290/44, 290/55
See application file for complete search history.

(56) References Cited

U.S. PATENT DOCUMENTS

| | | | |
|---|---|---|---|
| 1,510,343 A | 9/1924 | Rask | 318/68 |
| 1,913,371 A | 6/1933 | Cleaver | 310/96 |
| 2,864,016 A | 12/1958 | Waltscheff | 310/102 R |
| 3,183,431 A | 5/1965 | Ford | 322/32 |
| 3,378,710 A | 4/1968 | Martin, Jr. et al. | 310/104 |
| 3,441,822 A * | 4/1969 | Shibata | 318/735 |
| 3,683,249 A | 8/1972 | Shibata | 318/730 |
| 3,700,941 A | 10/1972 | Duncan | 310/105 |
| 3,754,174 A * | 8/1973 | Shibata | 318/9 |
| 4,373,147 A * | 2/1983 | Carlson, Jr. | 318/48 |
| 4,375,047 A * | 2/1983 | Nelson et al. | 318/48 |
| 4,503,377 A | 3/1985 | Kitabayashi et al. | 318/807 |
| 5,029,288 A | 7/1991 | Kubota et al. | 322/29 |
| 5,696,417 A | 12/1997 | Arimoto | 310/114 |

(Continued)

FOREIGN PATENT DOCUMENTS

EP    1 353 436 A2    10/2003

(Continued)

OTHER PUBLICATIONS

K. Atallah et al.; "Design, analysis and realization of a high-performance magnetic gear;" IEEE Proc.-Electr. Power Appl., Vo. 151, No. 2, Mar. 2004, pp. 135-143.

(Continued)

*Primary Examiner* — Pedro J Cuevas
(74) *Attorney, Agent, or Firm* — Global Patent Operation; Douglas D. Zhang

(57) ABSTRACT

The present invention provides a magnetically geared generator including an inner winding unit having a first number of pole pairs, an outer winding unit arranged coaxially around the inner winding unit and having a second number of pole pairs, and a rotatable magnetic flux modulator arranged coaxially between the inner winding unit and the outer winding unit. The inner winding unit, the outer winding unit and the rotatable magnetic flux modulator are adapted to convert rotational input energy provided at the rotatable magnetic flux modulator into electrical output energy provided as an alternating output current at one of the inner winding unit and the outer winding unit, and to control an output frequency of the alternating output current by communicating output energy as an alternating feedback current to the other one of the inner winding unit and the outer winding unit and by adjusting a feedback frequency of the alternating feedback current.

10 Claims, 6 Drawing Sheets

U.S. PATENT DOCUMENTS

| | | | | |
|---|---|---|---|---|
| 5,744,895 A * | 4/1998 | Seguchi et al. | | 310/266 |
| 5,783,893 A | 7/1998 | Dade et al. | | 310/266 |
| 5,789,877 A * | 8/1998 | Yamada et al. | | 318/9 |
| 5,791,426 A * | 8/1998 | Yamada et al. | | 180/65.24 |
| 5,793,136 A | 8/1998 | Redzic | | 310/114 |
| 5,798,631 A | 8/1998 | Spée et al. | | 322/25 |
| 5,804,934 A * | 9/1998 | Yamada et al. | | 318/77 |
| 5,873,801 A * | 2/1999 | Taga et al. | | 477/5 |
| 5,903,112 A * | 5/1999 | Yamada et al. | | 318/10 |
| 5,903,113 A * | 5/1999 | Yamada et al. | | 318/10 |
| 5,905,346 A * | 5/1999 | Yamada et al. | | 318/50 |
| 5,909,094 A * | 6/1999 | Yamada et al. | | 318/140 |
| 5,917,248 A * | 6/1999 | Seguchi et al. | | 290/31 |
| 5,920,160 A * | 7/1999 | Yamada et al. | | 318/9 |
| 5,942,862 A * | 8/1999 | Yamada et al. | | 318/9 |
| 5,973,460 A * | 10/1999 | Taga et al. | | 318/139 |
| 5,988,307 A * | 11/1999 | Yamada et al. | | 180/243 |
| 5,998,901 A * | 12/1999 | Kawabata et al. | | 310/114 |
| 6,087,734 A * | 7/2000 | Maeda et al. | | 290/40 C |
| 6,297,575 B1 * | 10/2001 | Yang | | 310/266 |
| 6,355,999 B1 | 3/2002 | Kichiji et al. | | 310/112 |
| 6,624,545 B1 * | 9/2003 | Furuse | | 310/216.114 |
| 6,784,634 B2 | 8/2004 | Sweo | | 318/727 |
| 6,794,781 B2 | 9/2004 | Razzell et al. | | 310/114 |
| 6,848,165 B1 * | 2/2005 | Furuse | | 29/596 |
| 6,864,608 B2 | 3/2005 | Kang et al. | | 310/154.02 |
| 7,154,191 B2 | 12/2006 | Jansen et al. | | 290/55 |
| 7,804,215 B2 * | 9/2010 | Hemmelmann et al. | | 310/104 |
| 8,044,527 B2 * | 10/2011 | Mari et al. | | 290/44 |
| 2007/0132248 A1 | 6/2007 | Weng et al. | | 290/44 |
| 2007/0182383 A1 | 8/2007 | Park et al. | | 322/89 |
| 2007/0186692 A1 * | 8/2007 | Waszak et al. | | 73/862.331 |
| 2009/0079191 A1 * | 3/2009 | Mari et al. | | 290/43 |
| 2010/0079016 A1 * | 4/2010 | Hemmelmann et al. | | 310/54 |

FOREIGN PATENT DOCUMENTS

| | | |
|---|---|---|
| EP | 1499009 A1 | 1/2005 |
| EP | 1612415 A2 | 1/2006 |
| WO | 03/026121 A1 | 3/2003 |
| WO | 2004040740 A1 | 5/2007 |
| WO | 2005046044 A1 | 5/2007 |
| WO | 2007/125284 A1 | 11/2007 |

OTHER PUBLICATIONS

K. Atallah et al.; "A Novel High-Performance Magnetic Gear;" IEEE Transactions of Magnetics, vol. 37, No. 4, Jul. 2001, pp. 2844-28464.

P.O. Rasmussen et al.; "Development of a High-Performance Magnetic Gear;" IEEE Transactions of Industry Applications, vol. 41, No. 3, May/Jun. 2005, pp. 764-770.

* cited by examiner

MAGNETICALLY GEARED GENERATOR

BACKGROUND

The present disclosure generally relates to an electrical generator or motor for converting rotational input energy into electrical output energy. Specifically, the present disclosure relates to a magnetically geared generator or motor including a magnetic gear unit combined with an electrical generator or motor.

In ship propulsion systems and wind energy turbines, e.g., a prime mover drives the propeller or wind drives the rotor, respectively, at variable speeds via a mechanical shaft such that rotational energy is input. The rotational energy is converted into electrical energy using an electrical generator which supplies an electrical frequency to an electrical distribution network of the ship or the wind turbine, respectively. Typical rotation speeds of wind turbine rotors, e.g., are in the order of 15 rpm such that a mechanical gear box has to be provided in order to obtain an output rotational frequency of 1500 rpm which is required by electrical machines to yield an electrical output frequency of 50 Hz.

In such an arrangement, a mechanical gearing is required in order to provide a sufficient rotational frequency for conventional electrical generators. Furthermore, the electrical output frequency should be constant even if the mechanical rotational input frequency is varied.

Especially for wind turbines mechanical gear boxes have to operate at a very high rotational torque in the order of Mega-Newton meters (MNm). Thus, a mechanical gear box may have a weight of up to 100 tons which has to be accommodated in a nacelle of a wind turbine high above ground.

SUMMARY

In view of the above a magnetically geared generator is provided, the generator including an inner winding unit having a first number of pole pairs, an outer winding unit arranged coaxially around the inner winding unit and having a second number of pole pairs, and a rotatable magnetic flux modulator arranged coaxially between the inner winding unit and the outer winding unit, wherein the inner winding unit, the outer winding unit and the rotatable magnetic flux modulator are adapted to convert rotational input energy provided at the rotatable magnetic flux modulator into electrical output energy provided as an alternating output current at one of the inner winding unit and the outer winding unit, and to control an output frequency of the alternating output current by communicating output energy as an alternating feedback current to the other one of the inner winding unit and the outer winding unit and by adjusting a feedback frequency of the alternating feedback current and its phase and amplitude.

According to a further aspect an energy conversion apparatus adapted for converting rotational energy having a varying rotational frequency into electrical energy having a fixed frequency is provided, the energy conversion apparatus including a drive shaft for inputting the rotational energy, a rotation sensor for detecting the rotational frequency, a magnetically geared generator including an inner winding unit having a first number of pole pairs, an outer winding unit arranged coaxially around the inner winding unit and having a second number of pole pairs, and a rotatable magnetic flux modulator arranged coaxially between the inner winding unit and the outer winding unit, wherein rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current and its phase and amplitude, and an electrical output unit for outputting the electrical energy.

According to yet a further aspect a wind turbine including a rotor adapted for converting wind energy into mechanical energy is provided, the rotor having a main shaft and a plurality of rotor blades, and a hub, said wind turbine further including a magnetically geared generator adapted for converting the mechanical energy into electrical energy, including an inner winding unit having a first number of pole pairs, an outer winding unit arranged coaxially around the inner winding unit and having a second number of pole pairs, and a rotatable magnetic flux modulator arranged coaxially between the inner winding unit and the outer winding unit, wherein rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current and its phase and amplitude.

According to yet a further aspect a method for converting mechanical energy into electrical energy is provided, the method including the steps of providing an inner winding unit having a first number of pole pairs, providing an outer winding unit arranged coaxially around the inner winding unit and having a second number of pole pairs, and rotating a rotatable magnetic flux modulator arranged coaxially between the inner winding unit and the outer winding unit, wherein rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current.

Further exemplary embodiments of the present invention are according to the dependent claims, the description and the accompanying drawings.

DRAWINGS

A full and enabling disclosure of the present invention, including the best mode thereof, to one of ordinary skill in the art is set forth more particularly in the remainder of the specification, including reference to the accompanying drawings, wherein.

DETAILED DESCRIPTION

Figure 1:
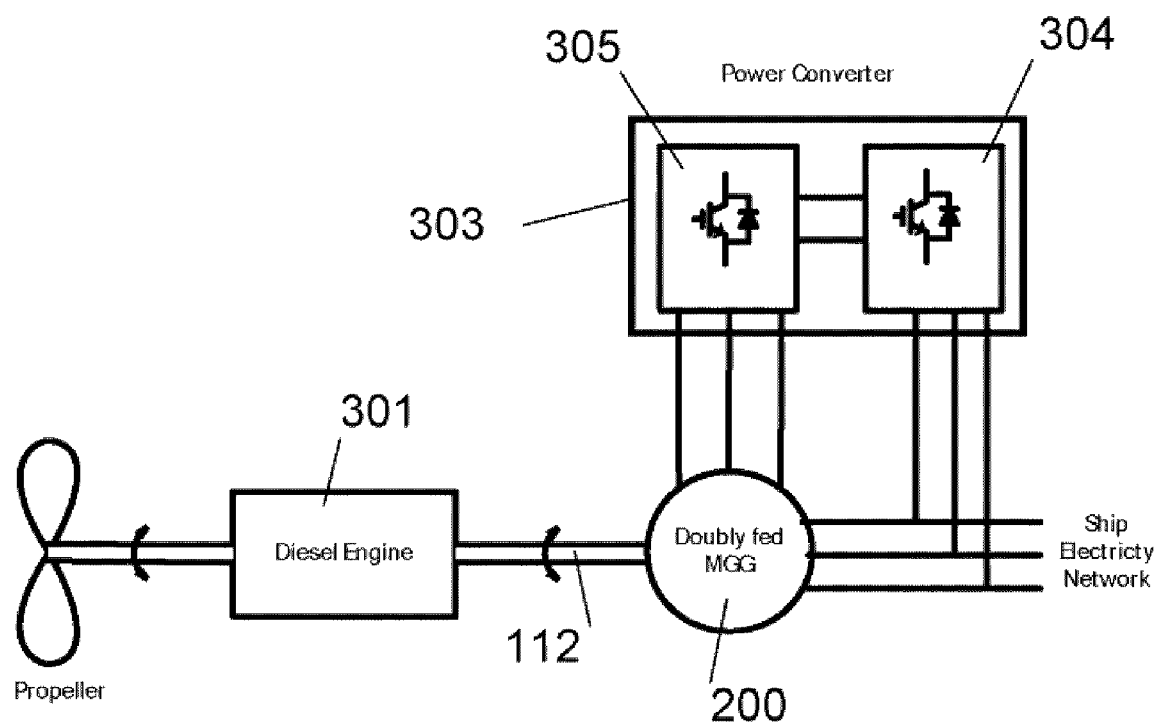
FIG. 1 illustrates a block diagram of an energy conversion apparatus including a magnetically geared generator and a frequency converter.

Reference will now be made in detail to various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale but rather serve only for the better understanding of the embodiments.

FIG. 1 shows a block diagram of an energy conversion apparatus according to an embodiment The energy conversion apparatus is adapted for converting mechanical energy into electrical energy. The energy conversion apparatus shown in FIG. 1 is a typical example of how a magnetically geared generator 200 may be used for providing electrical energy for a ship electrical network if a diesel engine 301 drives the magnetically geared generator 200 via a central axis 204. On the other hand, the diesel engine 301, which is provided as a mechanical energy source, drives a propeller for the ship propulsion.

It is noted here that, albeit the typical embodiments described here are related to a generator, an electrical motor or motor drive may also be included in the energy conversion apparatus.

According to a typical embodiment, a part of the electrical output energy communicated, or fed back, as a feedback energy, to a frequency converter 303 which provides an excitation energy for a specific winding unit of the magnetically geared generator.

It is noted here that instead of communicating or feeding back a part of the electrical output energy as an alternating feedback current to one of the inner winding unit and the outer winding unit, it is possible to use external energy from an external energy source like an electricity grid or another generator in order to provide an alternating feedback current which is used as an excitation current for the generator or motor.

It is noted here that details of the configuration shown in FIG. 1 will be described with respect to FIG. 4 herein below. The frequency converter (power converter) 303 includes a rectifier unit 304 rectifying the part of the electrical output energy which is fed back to the magnetically geared generator 200, and an inverter unit 305 which is used to provide a feedback energy for a specific winding unit 201, 203 of the mechanically geared generator 200. The frequency converter 303 functions as a power converter as well, but in order to obtain a constant output frequency, the frequency conversion function of the frequency converter 303 is the dominating feature. The rectifier unit 304 can be made from passive components such as diodes and from active components such as IGBTs (insulated gate bipolar transistors).

The inverter unit 305 is configured to provide a feedback energy of an adjustable frequency. The frequency of the feedback energy which is provided as an alternating feedback current is adjusted with respect to the rotational input frequency into the magnetically geared generator 200 which is provided via the central shaft (central axis) 204.

Figure 2:
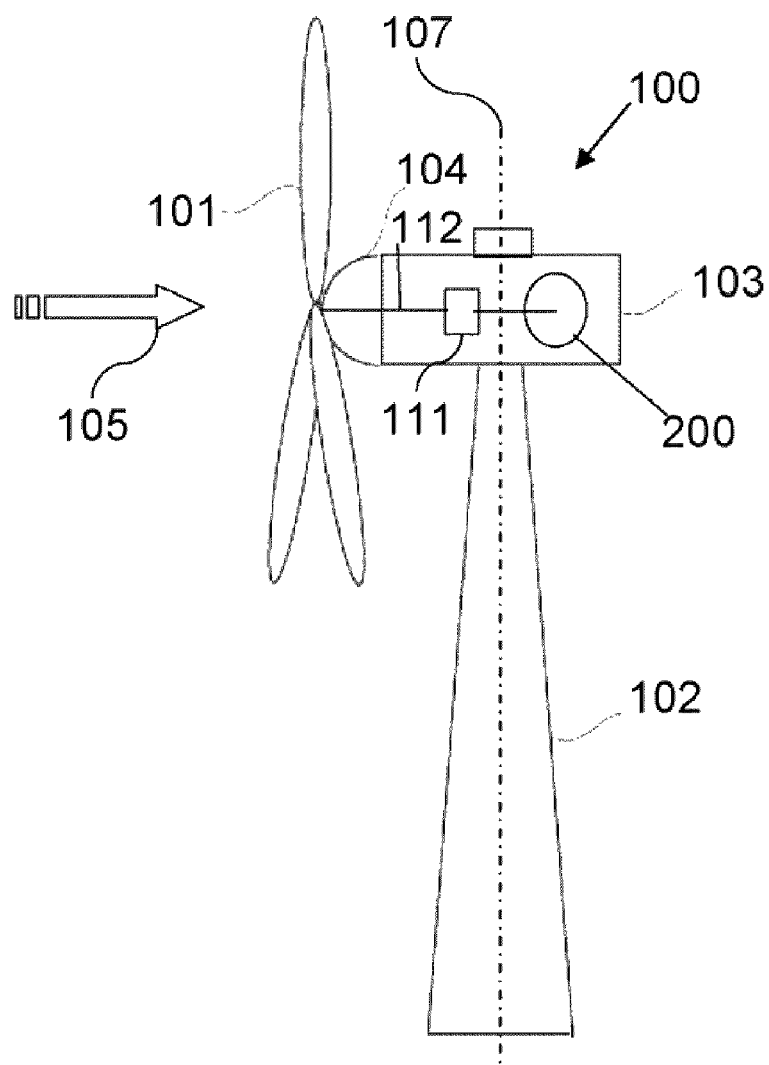
FIG. 2 shows a wind turbine having a magnetically geared generator mounted inside a machine nacelle.

FIG. 2 shows an example where the magnetically geared generator 200 is arranged in a machine nacelle 103 of a wind turbine 100. The wind turbine 100 includes a rotor for converting wind energy into mechanical energy and a hub 104. The rotor includes a main shaft 112 and a plurality of rotor blades 101. Between the central axis 204 of the magnetically geared generator 200 and the main shaft 112, a rotation sensor 111 is provided in order to measure the rotational input frequency (mechanical frequency, rotation frequency) of the wind turbine. This input frequency is measured, e.g. in rotations per minute, i.e. in rpm.

It is noted here that another means for providing rotational information may be provided, e.g. via indirect measurements using estimation from other signals, so-called observers.

The rotation frequency is measured in order to adjust the feedback frequency of the magnetically geared generator 200. The machine nacelle 103 is mounted atop a tubular tower 102 having a vertical axis 107, which is a rotation axis of the machine nacelle 103. The machine nacelle 103 is rotated about the vertical axis 107 such that the machine nacelle 103 may be directed towards the incoming wind direction 105. Typically, a conversion efficiency for converting the wind energy into mechanical rotational energy can thus be increased.

As shown in FIG. 2, the rotor of the wind turbine 100 is coupled to the magnetically geared generator 200 without any mechanical gearing inbetween. Thus, it is not necessary to provide a gear ratio based on a mechanical gear box.

Figure 3:
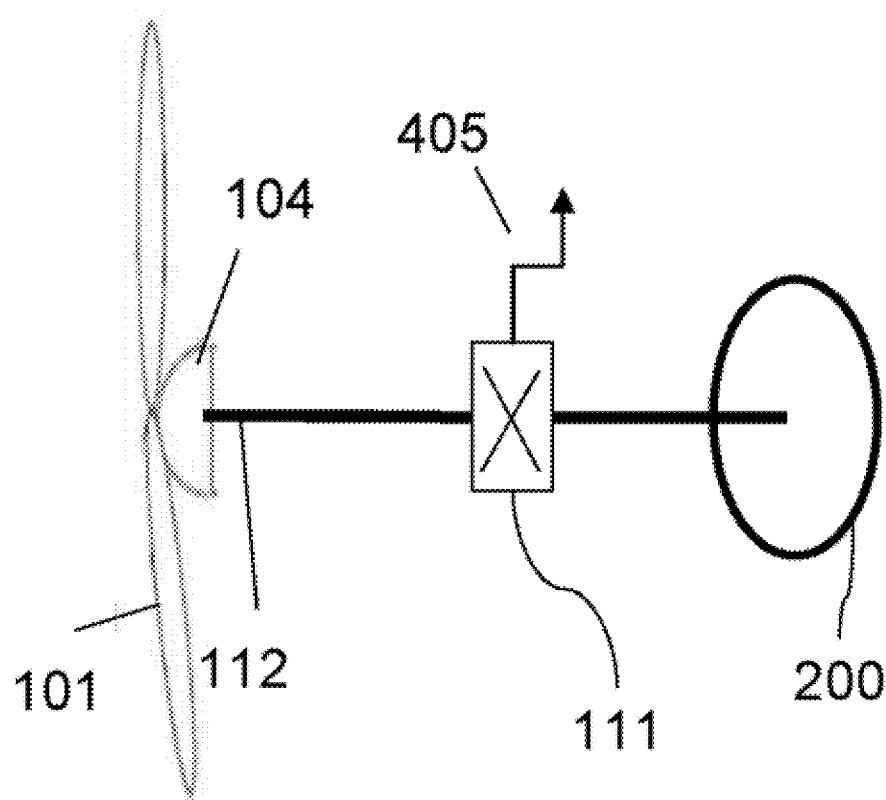
FIG. 3 shows in detail the connection between a hub of a wind turbine via a main shaft and a rotation sensor to the central axis of a magnetically geared generator.

FIG. 3 illustrates the components contained in the machine nacelle 103 in more detail. The hub 104 of the wind turbine 100 is connected to the rotor having the plurality of rotor blades 101. On the other hand, the hub 104 is connected to the main shaft 112 and to the central axis (central shaft) 204 of the magnetically geared generator 200.

The rotation sensor 111 is arranged on the main shaft 112 such that the rotation frequency of the main shaft 112 can be measured in rpm. According to another typical embodiment, the rotational information can be derived indirectly from other signal such as motor control and/or excitation signals. Furthermore the rotation sensor 111 can provide a shaft position information such as an actual rotation angle of the main shaft. The output signal of the rotation sensor 111 is provided as a rotor frequency 405 and is used for further processing in the frequency converter 303 which will be described in detail with respect to FIG. 4 below.

Figure 4:
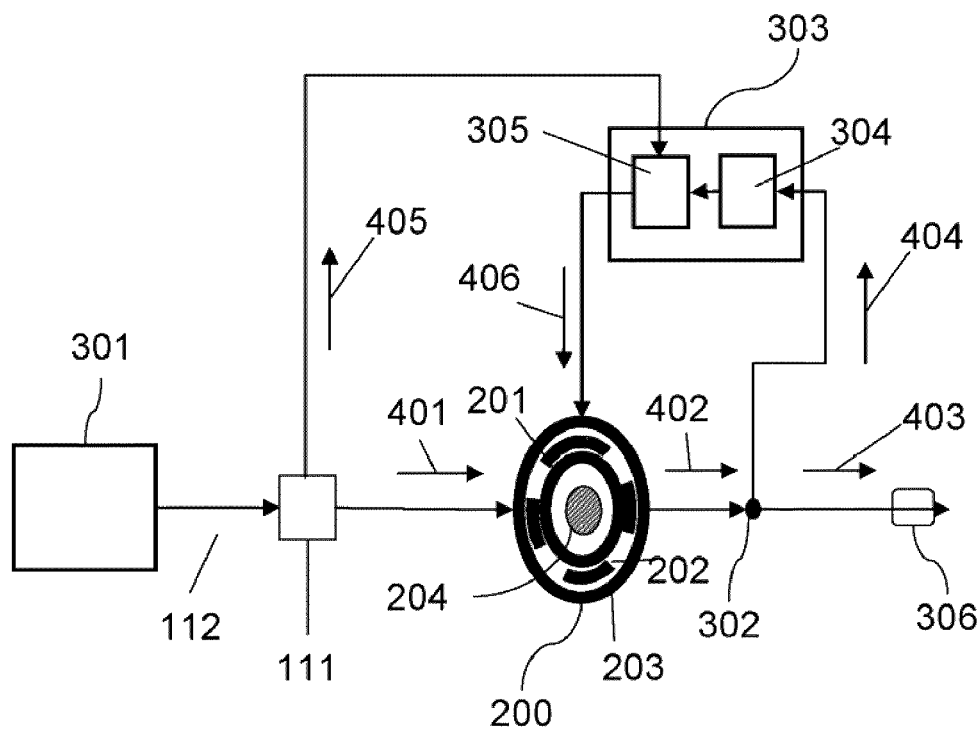
FIG. 4 is a detailed block diagram of an energy conversion apparatus according to a typical embodiment.

FIG. 4 illustrates a block diagram of a typical embodiment of an energy conversion apparatus having, as its central part, a magnetically geared generator 200.

As shown in FIG. 4, mechanical energy, i.e. rotational energy, provided by a mechanical energy source such as a wind turbine, is converted into electrical output energy 403 which is provided at an electrical output unit 306. Electrical energy 402 which is generated by the magnetically geared generator 200 is fed to an extraction unit 302 where a part of the generated electrical energy 402 flows as an electrical feedback energy 404 to the frequency converter 303. The extraction unit 302 may simply be provided as a connection point. The frequency converter 303 includes the rectifier unit 304 for rectifying the alternating current provided as the feedback energy 404 and the inverter unit 305 which provides an adjustable output frequency. The frequency converter 303 may include a conversion device. Typically, this conversion device is a four-quadrant combination of IGBTs (insulated gate bipolar transistors).

The feedback energy 404 is provided as an alternating feedback current such that the rectifier unit 304 is capable of providing a DC output signal as a function of the alternating feedback current provided as its input. The rectified alternating feedback current is fed as DC energy to the inverter unit 305 contained in the frequency converter 303. The inverter unit 305 provides an alternating excitation current 406 for at least one of the winding units 201, 203 of the magnetically geared generator 200. A detailed set-up of the magnetically geared generator with respect to its winding units 201, 203 is detailed below with reference to FIG. 5 and FIG. 6.

As shown in FIG. 4, the magnetically geared generator 200 includes of an inner winding unit 201 and an outer winding unit 203 which are stationary. As both winding units 201, 203 are arranged stationary (non-rotating), slip rings for supplying electrical energy to the respective winding unit 201, 203 are not required. The only rotating part of the magnetically geared generator 200 is a magnetic flux modulator 202 which is arranged coaxially between the inner winding unit and the outer winding unit.

In a typical embodiment, the inner winding unit 201 and the outer winding unit 203 each have a ring-shaped structure wherein the central axis 204 is a symmetry axis. The magnetic flux modulator 202 rotates about the central axis 204 when driven by a rotational force provided by the mechanical energy source 301.

It is noted here, with reference to FIGS. 1 and 2, that the mechanical energy source 301, e.g. can be a diesel engine (FIG. 1) or rotor of a wind turbine (FIG. 2). A rotational frequency of the rotatable magnetic flux modulator 202 is measured in order to be able to adjust the feedback frequency of the alternating feedback current, i.e. the excitation current for one of the inner winding unit 201 and the outer winding unit 203. The rotatable magnetic flux modulator 202 includes a number $N_P$ of pole pieces. Typically, the pole pieces are manufactured from iron inserts which are adapted to rotate about the central axis 204.

Figure 5:
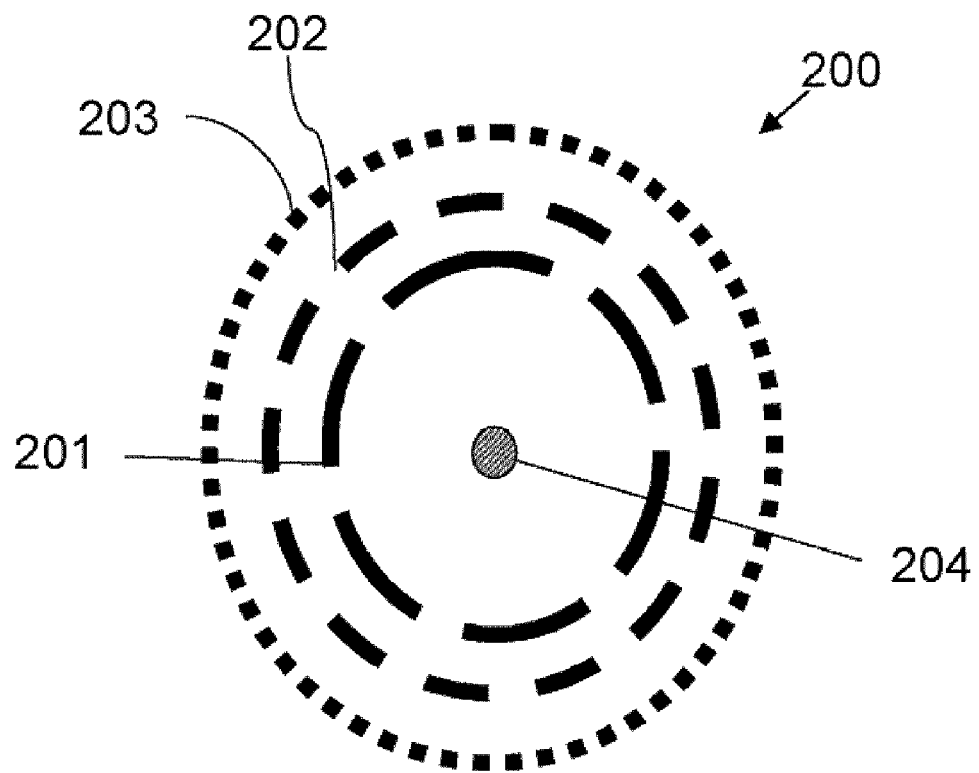
FIG. 5 is a cross-sectional view of a magnetically geared generator showing an inner winding unit, a magnetic flux modulator and an outer winding unit arranged symmetrically around a central axis.

FIG. 5 is a cross-section of the magnetically geared generator shown in FIG. 4. The schematic drawing of FIG. 5 shows that the inner winding unit 201 includes a number $P_S$ of pole pairs, whereas the outer winding unit 203 includes a number $P_R$ of pole pairs. The number of pole pairs $P_S$ of the inner winding unit and the number $P_R$ of the outer winding unit may be equal or different according to the application for which the generator is designed. The electrical frequency applied at the inner winding unit 201 is $\omega_S$. The frequency of the alternating output current is measured by means of a frequency counting unit (not shown). Both the inner winding unit 201 including the number $P_S$ of pole pairs and the outer winding unit 203 including includes the number $P_R$ of pole pairs are stationary.

The number of pole pairs of the outer winding unit 203 is $P_R$. The relation between the number of iron pole pieces $N_P$, the pole pairs $P_R$ of the outer winding unit 203 and the number of pole pairs $P_S$ of the inner winding unit 201 is according to the following equation (1):

$$N_P = P_R \pm P_S \quad (1)$$

It is noted here that in a typical embodiment the number of pole pairs $P_R$ of the outer winding unit 203 is larger than the number $P_S$ of the inner winding unit 201. This is due to the fact that the circumference of the outer winding unit 203 is larger than the circumference of the inner winding unit 201 such that the outer winding unit 203 can accommodate a larger number of pole pairs as compared to the inner winding unit 201.

Figure 6:
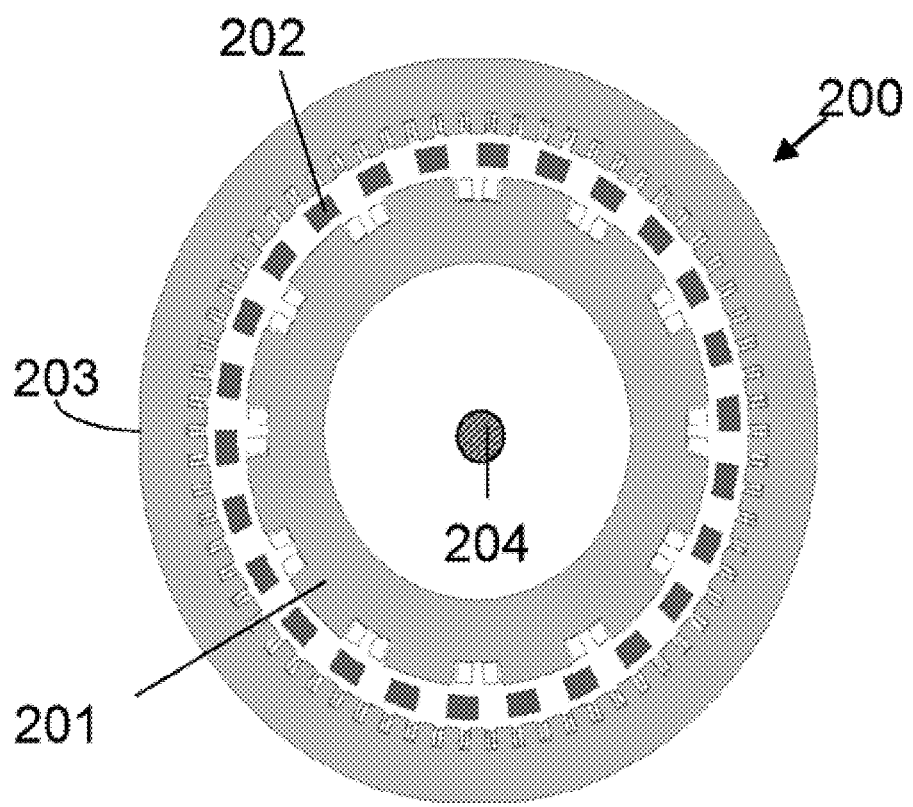
FIG. 6 exhibits details of winding units of the inner winding unit and the outer winding unit of the magnetically geared generator shown in FIG. 5.

FIG. 6 illustrates the set-up of the magnetically geared generator 200 having a central axis 204 and two winding units, i.e. the inner winding unit 201 and the outer winding unit 203. The magnetic flux modulator 202 is rotating about the central axis 204.

As shown in FIG. 6, the number of pole pairs of the inner winding unit 201 is smaller than the number of pole pairs of the outer winding unit 203. The electrical frequency applied at the outer winding unit 203 is $\omega_R$ which is the frequency of the excitation current 406 provided by the frequency converter 303, as shown in FIG. 4.

The frequency obtained at the inner winding unit 201 which has the number of pole pairs $P_S$ is $\omega_S$ which is the grid frequency of the electricity network to which the generated electrical energy has to be provided (see FIG. 1). Defining "rotational" frequencies $\Omega_S$ and $\Omega_R$ according to the following equations (2), an expression corresponding to a gear ratio i of a mechanical gear box (planetary drive) can be used:

$$\Omega_S = \omega_S / P_S$$

$$\Omega_R = \omega_R / P_R \quad (2)$$

A gear ratio is defined by the ratio of the number of pole pairs, i.e. the number of pole pairs $P_R$ of the outer winding unit 203 divided by the number of pole pairs $P_S$ of the inner winding unit 201, such that a gear ratio i is obtained according to the following equation (3):

$$i = \frac{P_R}{P_S} \quad (3)$$

The magnetically geared generator 200 provides a transformation of a low rotational frequency of the rotatable magnetic flux modulator 202 into a high frequency of the alternating output current provided at one of the inner winding unit 201 and the outer winding unit 203. Using the mechanical analogue, i.e. the gear ratio i of a mechanical gear box, the gear ratio i can be expressed according to equation (4)

$$i = \frac{\Omega_S - \Omega_P}{\Omega_R - \Omega_P} \quad (4)$$

wherein the frequency $\Omega_P$ corresponds to the rotational frequency of the mechanical energy which is input by the mechanical energy source 301 (see FIG. 4).

Thus the frequency of the alternating output current may exceed the rotational frequency of the rotatable magnetic flux modulator 202 by a factor which is determined by a magnetic gear ratio of the magnetically geared generator 200.

Using equation (4), the following relation (5) holds:

$$\Omega_S - \Omega_P = i\Omega_R - i\Omega_P \quad (5)$$

Inserting the definitions of a frequency equivalent to a mechanical frequency according to equations (2) into equation (5) shown above, the following equation (6) is obtained:

$$\frac{\omega_S}{P_S} - i\frac{\omega_R}{P_R} = (1-i)\Omega_P \quad (6)$$

As mentioned above, the output frequency of the magnetically geared generator, i.e. the frequency of the alternating output current providing the electrical output energy 403, corresponds to the grid frequency (50 Hz or 60 Hz, respectively), such that equation (7) holds:

$$\omega_S = \omega_{grid} \quad (7)$$

Inserting equations (3) (gear ratio) and (7) (output frequency) into equation (6) results in an expression shown in equation (8):

$$\frac{\omega_{grid}}{P_S} - \frac{\omega_R}{P_S} = \left(1 - \frac{P_R}{P_S}\right)\Omega_P \quad (8)$$

From equation (8) above, the frequency of the feedback current, i.e. the excitation current 406 which is provided by the frequency converter 303, can be calculated in dependence of the mechanical input frequency $\Omega_P$ which is a varying quantity. Thus equation (8) can be rewritten in the following equation (9)

$$\omega_R = (P_R - P_S)\Omega_P + \omega_{grid} \quad (9)$$

Thus it is possible to provide a constant grid frequency $\omega_{grid}$ even if the mechanical input frequency (rotational frequency) $\Omega_P$ is varying.

In the equation (9) written above, it is assumed that the number of pole pairs $P_R$ of the outer winding unit 203 exceeds the number of pole pairs $P_S$ of the inner winding unit 201. In any case, the number of iron inserts $N_P$ has to be provided according to equation (1) discussed above. Thus, the magnetically geared generator according to a typical embodiment provides a fixed electrical output frequency $\omega_{grid}$ at variable mechanical input speeds.

In the magnetically geared generator a mechanical gear box and an electrical generator are combined. The information about the rotational frequency $\Omega_P$ is provided by the rotation sensor 111 shown in FIG. 4 such that the frequency converter 303 can adjust the frequency $\omega_R$ of the excitation current 406 exciting the pole pairs of the outer winding unit 203 according to equation (9) discussed above. The magnetically geared generator generates less acoustic noise than conventional mechanical gearboxes. It is noted here, however, that acoustic noise emission may also result from torque ripple on the main shaft and induced vibrations which are present even without a mechanical gearbox.

According to still a further embodiment, the magnetically geared generator may be used as a torque generator. In this mode of operation, electrical input energy provided as an alternating input current at one of the inner winding unit and the outer winding unit is converted into rotational output energy provided at the rotatable magnetic flux modulator.

The invention has been described on the basis of embodiments which are shown in the appended drawings and from which further advantages and modifications emerge. However, the invention is not restricted to the embodiments described in concrete terms, but rather can be modified and varied in a suitable manner. It lies within the scope of the invention to combine individual features and combinations of features of one embodiment with features and combinations of features of another embodiment in a suitable manner in order to arrive at further embodiments according to the invention.

It will be obvious to those skilled in the art, based upon the teachings herein, that changes and modifications may be made without departing from the invention disclosed and its broader aspects. That is, all examples set forth herein above are intended to be exemplary and non-limiting.

What is claimed is:

1. A magnetically geared generator, comprising:
a inner winding unit having a first number of pole pairs;
an outer winding unit arranged coaxially around the inner winding unit and having a second number of pole pairs; and
a rotatable magnetic flux modulator arranged coaxially between the inner winding unit and the outer winding unit, wherein the inner winding unit, the outer winding unit and the rotatable magnetic flux modulator are adapted
to convert rotational input energy provided at the rotatable magnetic flux modulator into electrical output energy provided as an alternating output current at one of the inner winding unit and the outer winding unit, and
to control an output frequency of the alternating output current by communicating output energy as an alternating feedback current to the other one of the inner winding unit and the outer winding unit and by adjusting a feedback frequency of the alternating feedback current.

2. The magnetically geared generator in accordance with claim 1, wherein the frequency of the alternating output current corresponds to the grid frequency.

3. The magnetically geared generator in accordance with claim 1, wherein a rotational frequency of the rotatable magnetic flux modulator is determined by means of a rotation sensor connected to a central axis the rotatable magnetic flux modulator.

4. The magnetically geared generator in accordance with claim 1, wherein the rotatable magnetic flux modulator comprises a plurality of pole pieces, wherein the number $N_P$ of pole pieces corresponds to $N_P = P_R \pm P_S$ wherein $P_R$ is the first number of pole pairs and $P_S$ is the second number of pole pairs.

5. The magnetically geared generator in accordance with claim 1, wherein the frequency of the alternating output current is measured by means of a frequency counting unit.

6. The magnetically geared generator in accordance with claim 1, wherein the magnetically geared generator provides a transformation of a low rotational frequency of the rotatable magnetic flux modulator into a high frequency of the alternating output current provided at one of the inner winding unit and the outer winding unit.

7. The magnetically geared generator in accordance with claim 1, wherein the frequency of the alternating output current exceeds the rotational frequency of the rotatable magnetic flux modulator by a factor which is determined by a magnetic gear ratio of the magnetically geared generator.

8. An energy conversion apparatus adapted for converting rotational energy having a varying rotational frequency into electrical energy having a fixed frequency, the energy conversion apparatus comprising:
a drive shaft for inputting the rotational energy;
a rotation sensor for detecting the rotational frequency;
a magnetically geared generator, comprising
a inner winding unit having a first number of pole pairs;
an outer winding unit arranged coaxially around the inner winding unit and having a second number of pole pairs; and
a rotatable magnetic flux modulator arranged coaxially between the inner winding unit and the outer winding unit, wherein
rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current;

and an electrical output unit for outputting the electrical energy.

9. A wind turbine comprising a rotor adapted for converting wind energy into mechanical energy, the rotor having a main shaft and a plurality of rotor blades, and a hub, said wind turbine further comprising a magnetically geared generator adapted for converting the mechanical energy into electrical energy, comprising:

an inner winding unit having a first number of pole pairs;

an outer winding unit arranged coaxially around the inner winding unit and having a second number of pole pairs; and a rotatable magnetic flux modulator arranged coaxially between the inner winding unit and the outer winding unit, wherein rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current.

10. A method for converting mechanical energy into electrical energy, the method comprising providing an inner winding unit having a first number of pole pairs;

providing an outer winding unit arranged coaxially around the inner winding unit and having a second number of pole pairs; and rotating a rotatable magnetic flux modulator arranged coaxially between the inner winding unit and the outer winding unit, wherein rotational input energy provided at the rotatable magnetic flux modulator is converted into electrical output energy provided as an alternating output current at one of the inner winding unit and the outer winding unit, wherein an output frequency of the alternating output current is controlled by communicating output energy as an alternating feedback current to the other one of the inner winding unit and the outer winding unit and by adjusting a feedback frequency of the alternating feedback current.

* * * * *